United States Patent
Youdenko et al.

(10) Patent No.: US 6,983,445 B2
(45) Date of Patent: Jan. 3, 2006

(54) SYSTEM FOR CONTROLLING A PARAMETER

(75) Inventors: Konstantin Youdenko, Eindhoven (NL); Bartel Marinus Van De Sluis, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 654 days.

(21) Appl. No.: 09/885,708

(22) Filed: Jun. 20, 2001

(65) Prior Publication Data

US 2002/0054075 A1     May 9, 2002

(30) Foreign Application Priority Data

Jun. 22, 2000   (EP)  ................................. 00202170

(51) Int. Cl.
*G06F 9/44*     (2006.01)

(52) U.S. Cl. .................. 717/111; 345/173; 345/442; 715/764; 715/864

(58) Field of Classification Search ........ 717/110–113; 345/440.2–443, 763–764, 863–864, 173; 382/200–204; 715/764, 864
See application file for complete search history.

(56) References Cited

U.S. PATENT DOCUMENTS

| | | | |
|---|---|---|---|
| 4,236,084 A * | 11/1980 | Gingras ........................ 307/39 |
| 4,811,243 A * | 3/1989 | Racine ........................ 345/863 |
| 5,611,059 A | 3/1997 | Benton et al. .............. 345/734 |
| 5,654,739 A | 8/1997 | Sakai et al. .............. 345/440.1 |
| 5,680,560 A * | 10/1997 | Gaertner ..................... 345/764 |
| 6,259,438 B1 * | 7/2001 | Fleck et al. ................. 345/184 |
| 6,707,942 B1 * | 3/2004 | Cortopassi et al. ......... 382/186 |

FOREIGN PATENT DOCUMENTS

| DE | 3522064 A1 | 1/1987 |
|---|---|---|
| WO | WO9930214 | 6/1999 |

* cited by examiner

*Primary Examiner*—Kakali Chaki
*Assistant Examiner*—Lawrence Shrader
(74) *Attorney, Agent, or Firm*—Larry LiBerchuk

(57) ABSTRACT

The invention relates to a system for controlling a parameter by programming said parameter using a programmable control device. The system according to the invention comprises drawing means which enable a user to create a drawing. The system further comprises means for converting said drawing to a programming of said parameter.

9 Claims, 2 Drawing Sheets

SYSTEM FOR CONTROLLING A PARAMETER

FIELD OF THE INVENTION

The invention relates to a system for controlling a parameter, comprising programming means for programming said parameter. The invention further relates to a method of controlling a parameter, comprising a step of programming said parameter. The invention further relates to a computer program product for carrying out the above method.

BACKGROUND OF THE INVENTION

An example of such a system is a clock thermostat for controlling the central heating. Such a system enables a user to program the temperature in the course of the day. For this purpose, a user typically has to enter a number of clock times and for each clock time the desired temperature. Alternatively, the clock thermostat provides for a limited number of continuously adjustable temperature values, e.g. night and day temperatures, and each user-supplied clock time is related to any of these temperature values.

Another example of a system defined in the opening paragraph is an alarm clock, which can be programmed to produce an auditory wake-up signal, which may be a buzz or a radio program. Such an alarm clock also enables the user to enter one or a few clock times at which the wake-up signal has to be produced.

A disadvantage of the known systems is that the programming is cumbersome, requires a lot of button presses in a very precise order, offers limited programming options, is difficult to learn and easy to forget.

OBJECT AND SUMMARY OF THE INVENTION

It is an object of the invention to provide a system and method of the type defined in the opening paragraph which is easier to use. To this end, the system according to the invention is characterized in that the system comprises drawing means for enabling a user to create a drawing, the programming means being arranged for converting said drawing to a programming of said parameter. Preferably, the system provides a graphical touch screen, which enables a user to create the drawing by means of a stylus or just with his fingertip. Alternatively, any combination of a coordinate input device and a graphical display may be applied, e.g. an LCD screen in combination with a mouse, touch pad or trackball. In yet another embodiment the user can create the drawing on paper which is then scanned by the system.

An embodiment of the system according to the invention is characterized by each point of said drawing having an x-coordinate and a y-coordinate with respect to two orthogonal coordinate axes, said x-coordinate determining a point of time in said programming. Preferably, the orientation of the x-axis is horizontal and the orientation of the y-axis vertical. Any element of the drawing is then related by its x-coordinate to a particular point in time. The system may display a scale division along any or both coordinate axes, e.g. representing the 24 hours of a day. Such a scale division may be altered by the user, e.g. to obtain a more fine-grained sub-scale showing five-minute's intervals for programming a wake-up ambient.

In principle, the drawing may contain any type of characters, pictures, geometrical figures etc. which can be recognized by the system. For example, a picture of a 'sun' at a particular x-coordinate indicates that the day-time temperature should be set at the point of time related to this particular x-coordinate, while a picture of a 'moon' indicates that the system should switch to night-time temperature at that point of time. A painting of a cup of coffee could indicate that the coffee machine should be switched on at a particular moment.

An embodiment of the system according to the invention is characterized by the programming means being arranged for identifying a stroke in said drawing, and programming said parameter in accordance with at least one property of said stroke. In this way the user can create an arbitrary complex programming of the parameter by simply painting a stroke whose properties determine aspects of said parameter. Such properties may be a y-coordinate and/or a thickness and/or a color of said stroke at the x-coordinate corresponding to a particular point of time. For example, if the parameter to be controlled is the ambient temperature, the height of the temperature at a particular moment may be derived from the y-coordinate, the thickness or the color of the stroke at an x-coordinate corresponding to said particular moment. Ambient light may be controlled in the same way.

In a alarm clock system, the sound level of the wake-up signal may be programmed as a function of time, and similarly derived from said properties. Alternatively, or additionally, the type of wake-up signal, e.g. the category of music, could be expressed by any of said properties, e.g. the color of the stroke. For example, a stroke starting with a green part, could start a wake-up sequence with nature sounds, followed by classical music represented by a red part of the stroke, and ending with pop music, represented by a yellow part of the stroke. At the same time the volume of the sound may be increased gradually, by painting the stroke with a positive angle of inclination.

The y-coordinate can be directly controlled by drawing at the appropriate position of the input device. The thickness of the drawing may be controlled by means of a pressure-sensitive touch screen or stylus, an increased pressure resulting in a thicker drawing. Alternatively, the thickness of the drawing may be selected from a number of options, similar to well-known drawing packages, or just by painting the stroke by means of multiple lines and/or shading.

The color of the drawing may be controlled by a pressure-sensitive input device too, a higher pressure resulting in a succeeding color, e.g. in accordance with the order of the rainbow colors. Alternatively, the color of the drawing may be selected from a number of options, similar to well known drawing packages.

An embodiment of the system according to the invention is characterized by the system being capable of controlling a plurality of parameters, the programming means being arranged for deriving an identity of said parameter from said y-coordinate and/or a thickness and/or a color of said stroke, and/or a label near said stroke. For example, a drawing may be created comprising various strokes, each of which representing a different parameter. One stroke may represent a sound level, while another one may represent an intensity of ambient light, both gradually increasing so as to awake a person softly. Assignment of a specific parameter to a stroke may be accomplished in various ways. Parameters may be associated in advance with a specific color or type of stroke, e.g. dashed or continuous. When the user paints a stroke of a particular type or in a particular color, the system checks which parameter is associated with the specific type or color, and programs this parameter accordingly. Alternatively, the user is enabled to select a parameter before painting a stroke, and subsequently the system assigns the right type or color to the painted stroke. Text recognition means may be provided for recognizing handwritten labels near a stroke, e.g. 'T' indicating temperature.

In the case where only one parameter is controlled, or where the system has inferred the desired parameter as described above, the system may display a scale division to aid the user to paint the drawing. For example, if the y-coordinate is used for programming a value of the parameter, a scale division may be displayed along the vertical axis. If the thickness is used for programming the parameter, a scale division may be displayed on the vertical axis centered around the current y-coordinate of the stylus or finger, and floating along with it, so that the user has an idea which thickness corresponds to a particular value of the parameter.

The invention is particularly suitable for controlling various parameters in a home network, or specific applications such as a central heater or a wake-up system. The system may be implemented as a computer program product running on a personal computer, notebook or palm top computer, connected to a (wireless) home network. For the purpose of creating and editing the drawing, conventional techniques, known from computer drawing packages, may be used.

BRIEF DESCRIPTION OF THE DRAWINGS

These and other aspects of the invention are apparent from and will be elucidated, by way of a non-limitative example, with reference to the embodiment(s) described hereinafter. In the drawings.

DESCRIPTION OF EMBODIMENTS

Figure 1:
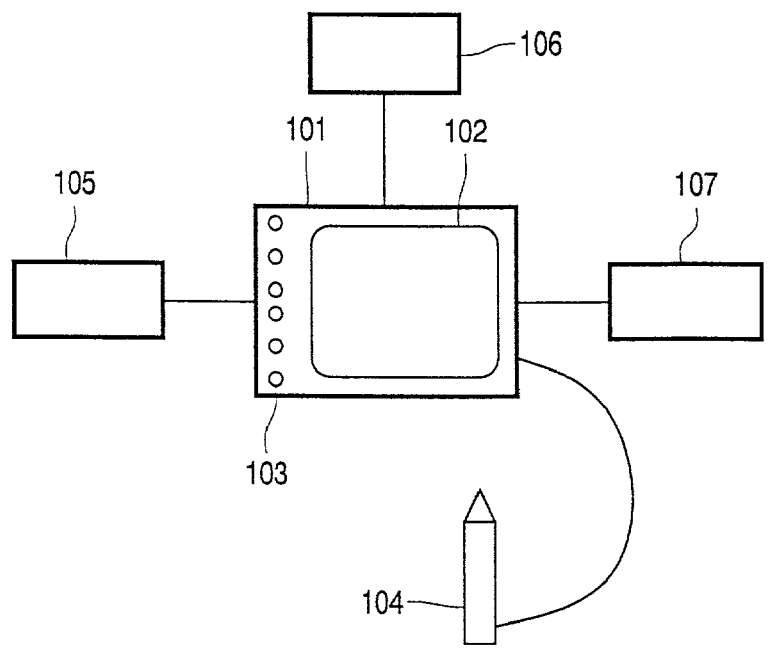
FIG. 1 shows a diagram of a home network system as an embodiment of the system according to the invention.

FIG. 1 shows a diagram of a home network system as an embodiment of the system according to the invention. A controller 101 comprises a display screen 102, control elements 103 and a stylus 104. A user can paint a drawing on the display screen 102 by means of the stylus 104. He can select a parameter to be controlled by means of control elements 103. The controller 101 is capable of controlling, inter alia, a sound system 105, a light system 106 and a heater 107. Each of these devices controls an ambient parameter, e.g. the heater 107 controls the home temperature, the light system 106 controls the ambient light, while the sound system 105 controls the ambient sound. Each device is assigned to one of control elements 103 and. By pressing such a control element, the user indicates that the strokes he is going to paint are associated with the assigned device, hence with the parameter controlled by the assigned device. Other control elements 103 are dedicated for invoking drawing functions, such as erasing parts of a drawing, choosing a different color, or any other well known drawing function.

The controller 101 further comprises a timer and a processor (not shown) for executing algorithms for interpreting the drawing created by the user, measuring the time and performing the actions for controlling the various parameters in accordance with the program inferred from the drawing.

Figure 2:
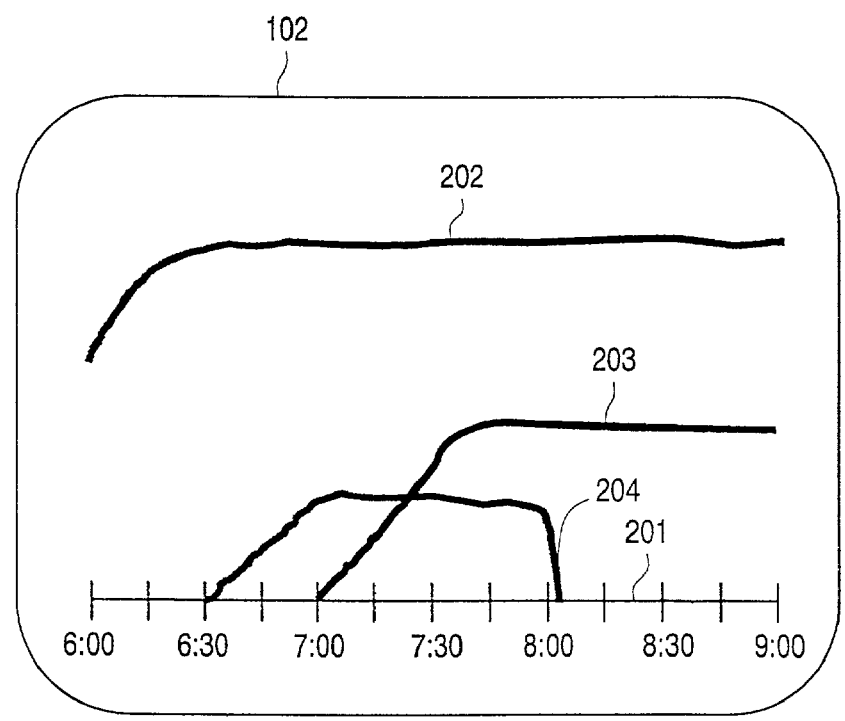
FIG. 2 shows an example of a drawing for creating a parameter control program according to the invention.

FIG. 2 shows an example of a drawing for creating a parameter control program according to the invention. Initially, a time scale division of, for example, 12 or 24 hours is displayed at the bottom of the display screen 102. The user can zoom in or zoom out, using techniques which are known per se, to select a smaller or larger part of the time scale, so as to be able to program with the desired degree of granularity. For example, for programming a wake-up ambient, a time scale division with five minute's intervals may be selected to conveniently program the various actions that have to be performed within a relative short time interval. In FIG. 2 a sub-scale 201 ranging from 6:00 to 9:00 is selected. The drawing comprises three strokes, each of which corresponding to a different parameter. Stroke 202 is associated with the home temperature, hence stroke 202 is used for programming the heater 107. In accordance with stroke 202, the home is heated between 6:00 and 6:30 to day-time temperature. The programming means of the controller 101 may comprise some specific knowledge about the heating process, particularly concerning the natural delay which occurs when a room is heated up. Hence, the stroke 202 may be interpreted in such a way, that the heater 107 is switched to full capacity at 6:00, or even earlier, in order to obtain the target temperature at 6:30.

Stroke 203 is associated with the ambient light conditions, i.e. with one or more light sources. In accordance with stroke 203, the light sources are switched on at 7:00 and gradually increase their intensity up to a maximum at 7:30 which is then maintained until (at least) 9:00.

Stroke 204 is associated with the sound system 105. At 6:30, the wake-up sound, which is preferably the sound of a radio program or local music carrier, starts at a very low level, and gradually increases until a maximum is reached at 7:00. At 8:00 the wake-up sound is turned off.

It may be difficult for a user to accurately draw smooth strokes, hence the strokes may contain unintended irregularities. To avoid that such irregularities are converted to unintended control commands, the controller 101 may comprise smoothening means, e.g. based on well known techniques such as aligning the drawing along a grid, or polynomial approximation.

Figure 3:
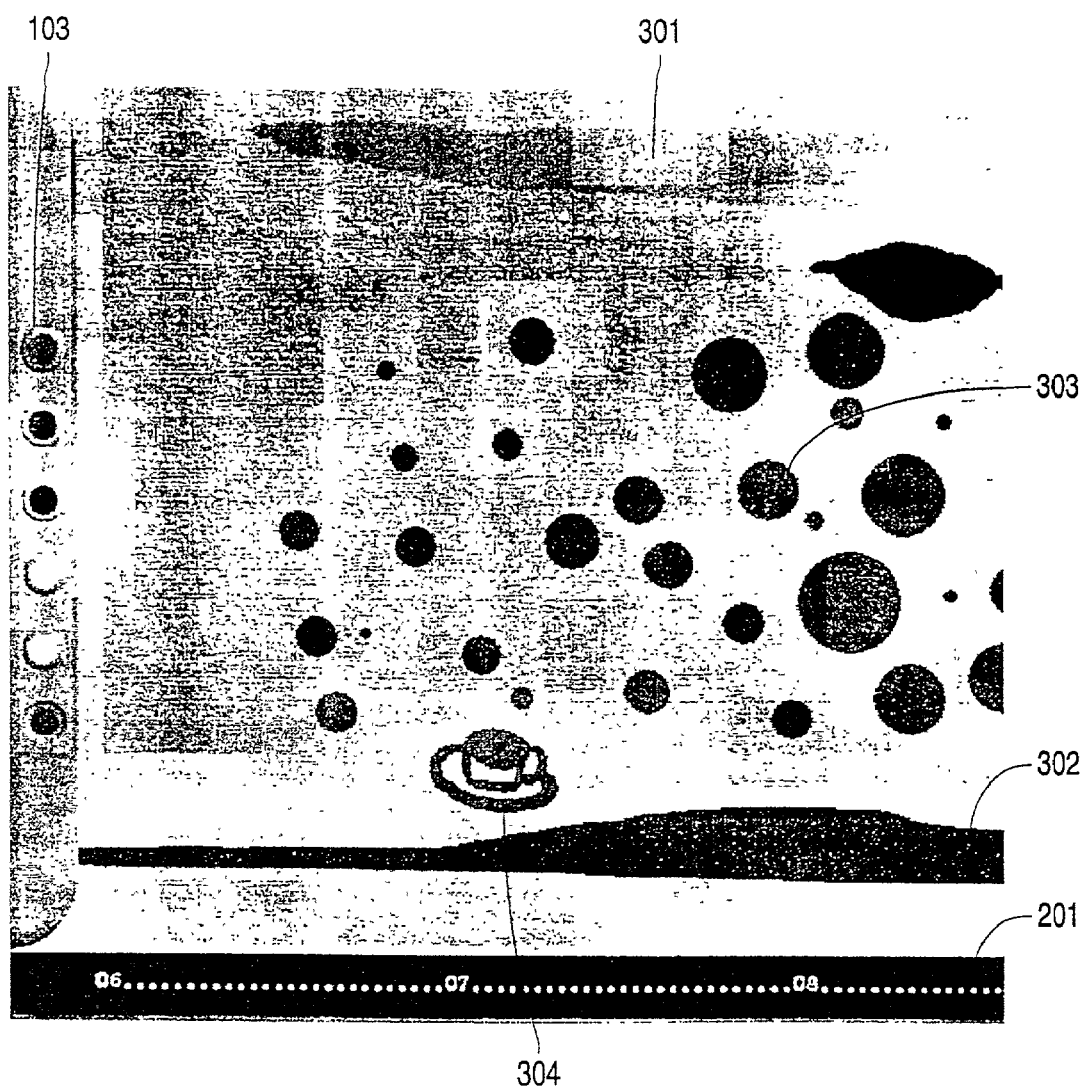
FIG. 3 shows another example of a drawing for creating a parameter control program according to the invention.

FIG. 3 shows another, more free-form, example of a drawing for creating a parameter control program according to the invention. It comprises, inter alia, strokes 301 and 302. For each of them the color determines which parameter it controls, and the width determines the amplitude of the controlled parameter. For example, stroke 301 determines the light intensity, while stroke 302 determines the volume of the sound system. A picture 304 of a cup of coffee indicates that the coffee machine is to be switched on, while the density distribution of dots 303 may determine yet another parameter such as smells or nature sounds.

The interpretation of the drawing may be predefined, imposing various restrictions upon the user in drawing pictures and strokes. For example, the cup of coffee 304 may be a prestored picture, which the user can drag to a specific position on the display screen. In a more advanced embodiment, the system comprises sophisticated picture analysis algorithms, mapping the drawing elements on predefined structures. Additionally, the system may utilize learning algorithms to learn the user specific drawings for expressing a desired program.

In summary, the invention relates to a system for controlling a parameter by programming said parameter using a programmable control device. The system according to the invention comprises drawing means which enable a user to create a drawing. The system further comprises means for converting said drawing to a programming of said parameter.

Although the invention has been described with reference to particular illustrative embodiments, variants and modifications are possible within the scope of the inventive concept. Thus, for example, the invention can be implemented by means of hardware comprising several distinct elements, and by means of a suitably programmed computer. In the device claim enumerating several means, several of these means can be embodied by one and the same item of hardware. The invention may as well be applied to program a parameter with respect to a parameter other than time. For example, a user may create a drawing for controlling a spatial light distribution in a room, i.e. the parameter is controlled as function of location instead of time.

The word 'comprising' does not exclude the presence of elements or steps other than those listed in a claim. A 'computer program' is to be understood to mean any software product stored on a computer-readable medium, such as a floppy-disk, downloadable via a network, such as the Internet, or marketable in any other manner.

What is claimed is:

1. A system for controlling a parameter, comprising programming means for programming said parameter, characterized in that the system comprises:
    drawing means for enabling a user to create a drawing;
    the programming means being arranged for converting said drawing to a programming of said parameter, each point of said drawing having an x-coordinate and a y-coordinate with respect to two orthogonal coordinate axes, said x-coordinate determining a point of time in said programming, the programming means being arranged for identifying a stroke in said drawing, and programming said parameter in accordance with at least one property of said stroke, the programming means being arranged for deriving a value of said parameter from a thickness and/or a color of said stroke at a certain point of time corresponding to the x-coordinate.

2. A system as claimed in claim 1, said parameter being an ambient temperature, said value being a height of said ambient temperature.

3. A system as claimed in claim 1, said parameter being an audio and/or video presentation, said value being a sound level of said presentation.

4. A system as claimed in claim 1, said parameter being an audio and/or video presentation, said value being a category of said audio and/or video presentation.

5. A system as claimed in claim 1, said parameter being an ambient light, said value being an intensity of said ambient light.

6. A system as claimed in claim 1, the system being capable of controlling a plurality of parameters, the programming means being arranged for deriving an identity of said parameter from said y-coordinate and/or a thickness and/or a color of said stroke, and/or a label near said stroke.

7. An apparatus suitable for use in controlling a parameter, the apparatus comprising programming means for programming said parameter, the programming means being arranged for converting a user drawing to a programming of said parameter, each point of said drawing having an x-coordinate and a y-coordinate with respect to two orthogonal coordinate axes, said x-coordinate determining a point of time in said programming, the programming means being arranged for deriving a value of said parameter from at least one of a thickness and a color of said stroke at a certain point of time corresponding to the x-coordinate.

8. A method of controlling a parameter, comprising programming said parameter converted from a drawing and deriving a value of said parameter from at least one of a thickness and a color of said stroke at a certain point of time corresponding to an x-coordinate in said drawing.

9. A computer program product for causing, when executed on a suitable computing device, a programming of a parameter converted from a drawing and deriving a value of said parameter from at least one of a thickness and a color of said stroke at a certain point of time corresponding to an x-coordinate in said drawing.

* * * * *